(12) United States Patent
Dörfler et al.

(10) Patent No.: US 6,189,667 B1
(45) Date of Patent: Feb. 20, 2001

(54) SELF-REINFORCING FRICTION CLUTCH (75) Inventors: Mathias Dörfler; Markus Heiartz, both of Schweinfurt (DE)

(73) Assignee: Mannesmann Sachs AG, Scweinfurt (DE)

(*) Notice: Under 35 U.S.C. 154(b), the term of this patent shall be extended for 0 days.

(21) Appl. No.: 09/354,450

(22) Filed: Jul. 15, 1999

(30) Foreign Application Priority Data

Jul. 16, 1998 (DE) .............................................. 198 31 991
Oct. 21, 1998 (DE) .............................................. 198 48 584

(51) Int. Cl.$^7$ .................................................. F16D 13/42
(52) U.S. Cl. .................. 192/52.5; 192/54.5; 192/70.18; 192/70.23; 192/70.3; 192/89.23
(58) Field of Search ................................ 192/52.5, 54.5, 192/70.18, 70.23, 70.24, 70.27, 89.23, 89.24, 93 A, 70.29, 70.3, 32, 35, 54.1, 52.4

(56) References Cited

U.S. PATENT DOCUMENTS

| | | | |
|---|---|---|---|
| 2,122,218 | * 6/1938 | Sneed | 192/32 X |
| 2,138,129 | * 11/1938 | Wolfram | 192/70.23 X |
| 2,146,044 | * 2/1939 | Wolfram | 192/52.5 X |
| 2,208,111 | * 7/1940 | Backstrom | 192/52.5 |
| 3,158,241 | * 11/1964 | Bloom | 192/52.5 X |
| 3,474,887 | 10/1969 | Hansen | 192/93 |
| 4,615,427 | * 10/1986 | Majima | 192/107 M |
| 4,986,403 | 1/1991 | Tipton | 192/70.11 |
| 5,054,598 | * 10/1991 | Tojima | 192/70.27 |
| 5,090,537 | * 2/1992 | Fukuda | 192/70.27 |
| 5,385,224 | 1/1995 | Uehara . | |
| 5,400,887 | 3/1995 | Mizukami et al. | 192/89.23 |
| 5,636,721 | 6/1997 | Weidinger | 192/70.27 |
| 5,765,674 | * 6/1998 | Schierling | 192/89.23 |

FOREIGN PATENT DOCUMENTS

| | | | |
|---|---|---|---|
| 39 40 917 | 6/1991 | (DE) | F16D/13/40 |
| 0 125 377 | 1/1984 | (EP) | F16D/13/71 |
| 1 361 792 | 7/1974 | (GB) | F16D/13/00 |
| 2 251 465 | 7/1992 | (GB) | F16D/13/42 |
| 2 286 640 | 8/1995 | (GB) | F16D/13/71 |
| 2 305 698 | 4/1997 | (GB) | F16D/13/75 |

* cited by examiner

Primary Examiner—Rodney H. Bonck
(74) Attorney, Agent, or Firm—Cohen, Pontani, Lieberman & Pavane (57) ABSTRACT

A friction clutch for motor vehicles has a casing which can be connected in a rotationally fixed manner to a driven flywheel mass. A pressure plate is arranged inside the casing with a pressure spring supported between the clutch casing and the pressure plate so that the pressure plate presses a clutch disk, which is provided with friction linings, onto the flywheel mass. The pressure spring, during engagement of the clutch, exerts a varying pressure force on the pressure plate. The friction clutch also having a device which acts on the pressure plate and varies essentially proportionally to the force of the pressure spring to force of the pressure plate.

20 Claims, 6 Drawing Sheets

SELF-REINFORCING FRICTION CLUTCH

BACKGROUND OF THE INVENTION

1. Field of the Invention

The invention relates to a friction clutch for motor vehicles having a clutch casing which is connectable in a rotationally fixed manner to a driven flywheel, a pressure plate arranged inside the clutch casing, and a pressure spring which is supported on the clutch casing for exerting a varying pressure force on the pressure plate during engagement of the clutch to press a clutch disk with friction linings onto the flywheel.

2. Description of the Related Art

A prior art friction clutch is known, for example, from German reference DE 39 40 917 A1. This reference discloses a friction clutch having a clutch casing in which a pressure plate is rotatably fixed and axially movable. A pressure spring is actuatable for pressing the pressure plate relative to the clutch casing onto a clutch disk. An actuation device which acts on the pressure spring and is mechanically or hydraulically actuated is provided to engage and disengage the clutch. The actuation device is arranged partly inside the clutch casing and the actuating member is guided out of the clutch casing. The friction clutch transmits the torque via the clutch disk which is connected to a transmission input shaft. Both sides of the clutch disk have friction linings arranged on a radially outer area. The clutch disk is pressed onto the flywheel of an internal combustion engine by the pressure plate. The pressure spring is designed as a diaphragm spring, and the actuating force which it applies determines the amount of torque which can be transmitted. If the pressure spring is lifted off the pressure plate, the pressure plate is released from the clutch disk and the torque which can be transmitted is reduced, possibly to zero. If the internal combustion engine fails to run smoothly—a characteristic of the internal combustion engines which in design terms is impossible to rule out—the resulting torque fluctuations and torque peaks, which would otherwise lead to increased wear, have to be transmitted without the clutch slipping. A similar problem arises during acceleration of a high-torque internal combustion engine or when a vehicle is moved off in a high gear. As a consequence of these factors, the pressure force which the diaphragm spring has to apply to the pressure plate must be correspondingly high, a fact which in principle requires the clutch to have excessive dimensions.

Since the space available in a motor vehicle—and therefore the available clutch friction radius—are limited, it is necessary to achieve a higher clutch moment by a higher pressure force, resulting in higher actuating forces. To avoid a reduction in comfort for the driver of the vehicle as a result of the high disengagement force required, servo devices are fitted, which boost the actuating force of the clutch pedal.

Inorganic friction linings which have a high coefficient of friction $\mu$ (for example greater than or equal to 0.3) may also be used to increase the torque which can be transmitted and therefore to reduce the pressure force required. However, the use of such friction linings has the undesirable side effect that the coefficient of friction $\mu$ of these friction linings, within a certain range, falls as the relative speed increases. Such friction linings may cause clutch grabbing when the clutch is engaged, which represents a considerable reduction in comfort for the passengers of the vehicle.

SUMMARY OF THE INVENTION

It is an object of the present invention to provide an improved friction clutch such that a torque which can be transmitted is influenced so that comfort is improved and/or so that a disengagement force is variable.

The object of the present invention is achieved by a friction clutch according to a first embodiment of the present invention including a device which acts on the pressure plate of the friction clutch and varies the pressure force on the pressure plate essentially proportionally to the force of the pressure spring when the clutch is in the engaged position. At least during operation, the device of this embodiment acts as a booster device and applies, for example, an additional force to the pressure plate which boosts the actuating force. The result is that the clutch has a self-reinforcing action. At the same time, this design of the booster device advantageously allows automatic readjustment of a position of the pressure plate in the event of a reduction in the thickness of the friction linings. Moreover, the preloading force of the pressure spring may be reduced over the prior art for an equal torque to be transmitted, resulting in reduced disengagement forces.

Another embodiment of the device is arranged for reducing the force of the pressure spring during operation instead of boosting the force of the pressure spring. This embodiment is useful in clutches having friction linings which are made from an inorganic material and which have a coefficient of friction that falls, within a certain range, as the relative sliding speed increases. This embodiment of the device acts on the pressure plate and, during engagement of the clutch, applies a pressure force to the pressure plate for proportionally reducing the force provided by the spring. This design increases the torque which can be transmitted by friction linings with a higher coefficient of friction. The clutch grabbing which is normally associated with these inorganic friction linings is avoided by the generation of a force which counteracts the spring force. As a result, a clutch fitted in this way produces a self-attenuating action. Therefore, in this embodiment of the clutch it is possible to reduce the preloading force of the pressure spring while achieving the same transmissible torque as that of conventional clutches, resulting in reduced disengagement forces, since suitable friction linings are used.

Furthermore, according to the invention it is advantageous if the pressure plate is permitted to rotate relative to the clutch casing within a predetermined range and the device is formed by at least one lever which is arranged pivotably between clutch casing or flywheel and pressure plate. Given suitable attachment of the device during a pulling mode—when internal combustion engine applies a driving force to the clutch disk such as when the vehicle is moving off and during accelerated travel—this pivotable lever enables the application of an additional pressure force to the pressure plate. Then, in a corresponding manner, the same arrangement in a pushing mode—when the vehicle pushes the engine—will result in attenuation of the additional pressure force. This arrangement can be utilized as an overload protector, e.g. when changing down to too low a gear, so that the engine is not forced to rotate too fast.

In the above-described embodiment, the device of the invention has at least one closed link. As a result, the corresponding lever is guided captively by the closed link and the other link may be open or may also be closed. For example, if the device is connected between the clutch casing and the pressure plate, one end of the device may be held onto the clutch casing (closed link) while the other end of the device merely abuts a portion of the pressure plate (open link). If two closed links are used, it is possible to transmit both compressive forces and tensile forces via the device.

It is also possible for the device to have two open links. In this case, it is only possible to transmit force in one direction, and an independent guide for the corresponding lever must be provided.

According to the invention, the lever may exert a compressive force on the pressure plate in the event of a relative movement between the pressure plate and the clutch casing or the flywheel. In such a case, it is possible, for example, to use a design including two open links, which is particularly simple to manufacture and assemble.

However, it is also entirely possible for the lever to exert a tensile force on the pressure plate in the event of a relative movement between the pressure plate and the clutch casing. This embodiment uses levers which are equipped with two closed links.

In an embodiment in which a device has at least one lever which is arranged pivotably between clutch casing or flywheel and pressure plate being used, the relative movement of the pressure plate can advantageously be controlled by a leaf spring which has a slot at a connection location. In this case, in the direction of load of the pressure plate which relieves the load on the lever, the leaf spring can be used to limit the relative movement of the pressure plate. The leaf spring may additionally be employed to generate a ventilating force to urge the pressure plate away from the friction linings of the clutch plate.

According to the invention, the lever includes an arm formed on the lever for applying force to the pressure plate. A further embodiment of the invention provides for the device to be formed by at least one leaf spring, which is connected to the pressure plate and the clutch casing. The articulation point of the leaf spring which lies at the front, relative to the direction of rotation, is provided on the pressure plate and the articulation point which lies at the rear is provided on the clutch casing. A connecting line running through the two articulation points is provided in a mathematically positive angle range, starting from a plane parallel to the friction surfaces. Appropriate design and attachment of the leaf spring allows the latter to generate an additional pressure force on the pressure plate in pulling mode or during acceleration, while in pushing mode this additional pressure force is attenuated. This leaf spring may also be preloaded such that it exerts a ventilating force on the pressure plate. This particular embodiment eliminates the need for separate components such that the clutch may, in practice, be put together in a conventional way with a small number of standard individual parts.

Of course, the rear articulation point of the leaf spring may also be arranged directly on the flywheel instead of the clutch housing. This does not affect the action.

The positive angle range for the connecting line between the two articulation points should, if at all possible, be greater than 20°.

The above-described use of a leaf spring preferably takes place in such a way that in pulling mode the result is an action which increases the pressure force. In pushing mode, in which the forces are usually significantly lower, this leaf spring is subjected to a compressive load. In principle, of course, the reverse situation is also possible, but in that case the leaf spring has to be suitably designed for the different load situations.

To improve the action of the above-described device, it is proposed, according to the invention, for a low-friction bearing to be arranged at the contact location between pressure plate and pressure spring. As a result, the resultant friction force is reduced at this location, so that the pressure plate can move easily with respect to the clutch casing. In principle, both a sliding-contact bearing and a roller bearing may be used for this purpose.

The invention enables, for example, a reduction in the friction radius of the clutch while keeping the pressure spring force constant. Reducing the friction radius allows the clutch to be of more compact design, thus reducing the space which it requires in a vehicle. Consequently, this design fulfills the requirement which is imposed on all components of modern vehicles to be as compact as possible, since, with a view to optimizing the vehicle, the space available in the engine compartment is being constantly reduced while at the same time increasing its equipment.

As the wear occurs on the friction linings, the angle of the levers or of the leaf spring may increase. The larger angle increases the self-reinforcing or self-attenuating effect. As a result, it is possible, for example, to shift the range of the characteristic line of the pressure spring which is utilized in such a way that, in the event of wear to the linings, the change in the pressure spring force and self-reinforcing action automatically compensate for one another.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

A friction clutch according to the present invention and its operation are explained with reference to FIGS. 1 to 3 and 5–6. The friction clutch comprises a clutch casing 9 connected to a flywheel 13 at a radially outer side by a screw connection 15. The flywheel 13 is attached to a crankshaft of an internal combustion engine and rotates with the crankshaft about an axis of rotation 14. A pressure plate 3 is arranged inside the clutch casing 9 and is connected to the clutch casing 9 in a rotationally fixed but axially displaceable manner. The pressure plate 3 is acted on by a pressure spring 4 which, in the present case, is a diaphragm spring. The pressure spring 4 is supported on the clutch casing 9 and exerts an engagement force on the pressure plate 3 directed toward the flywheel 13. The clamping force of the pressure spring 4 may be released via diaphragm spring tongues 4' which point radially inward. A clutch disk 6 is attached in a rotationally fixed manner to a transmission input shaft (not shown) via a hub 8 and is arranged between the pressure plate 3 and the flywheel 13. The clutch disk 6 has friction linings 11, 12 on its radially outer sides and is connected to the hub 8 by rivets 7. In the engaged position of the clutch, the clutch disk 6 is clamped between the pressure plate 3 and the flywheel 13 by the force of the diaphragm spring 4 to transmit torque. The diaphragm spring 4 is supported on the clutch casing 9 by spacer bolts 5. The radially outer area of the diaphragm spring 4 bears against an edge 32 of the pressure plate 3. The edge 32 may optionally comprise a low friction bearing 32a such as a sliding contact bearing or a roller bearing. In the drawings, the clutch is depicted as a so-called pushed friction clutch. However, a pulled friction clutch may also be provided. In the pulled friction clutch design, the external diameter of the diaphragm spring 4 is supported on the clutch casing 9, while a middle diameter is supported on the edge 32 of the pressure plate 3. In the present case of the pushed friction clutch, the torque transmission may be interrupted by pushing the spring tongues to the left in accordance with FIG. 3 by a disengagement device (not shown), thereby pivoting the pressure spring 4 about the attachment to the spacer bolts 5 with the result that the radially outer area of the diaphragm spring 4 no longer exerts any clamping force on the edge 32 of the pressure plate 3.

Figure 5:
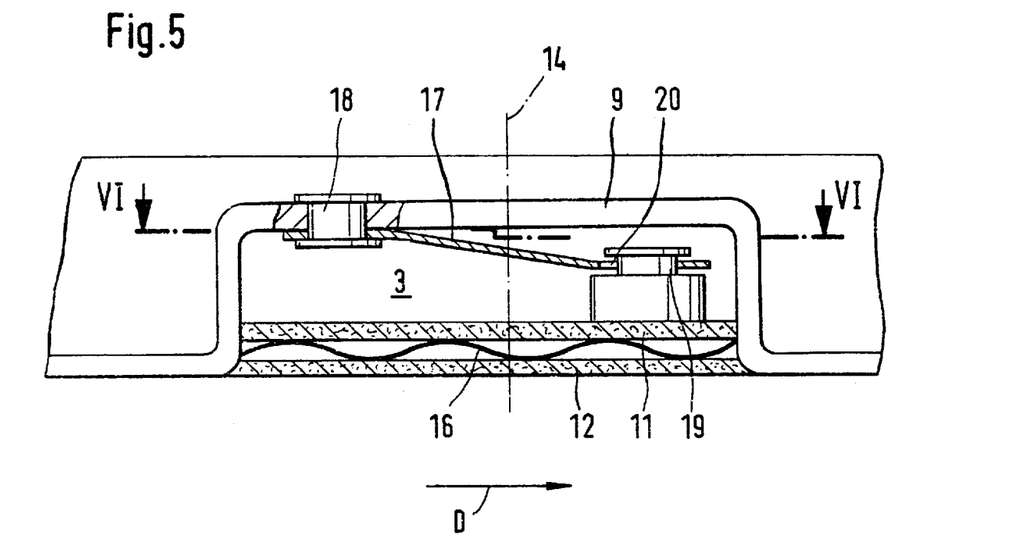
FIG. 5 is a partial radial view of the friction clutch in the direction of arrow V in accordance with FIG. 3.
Figure 6:
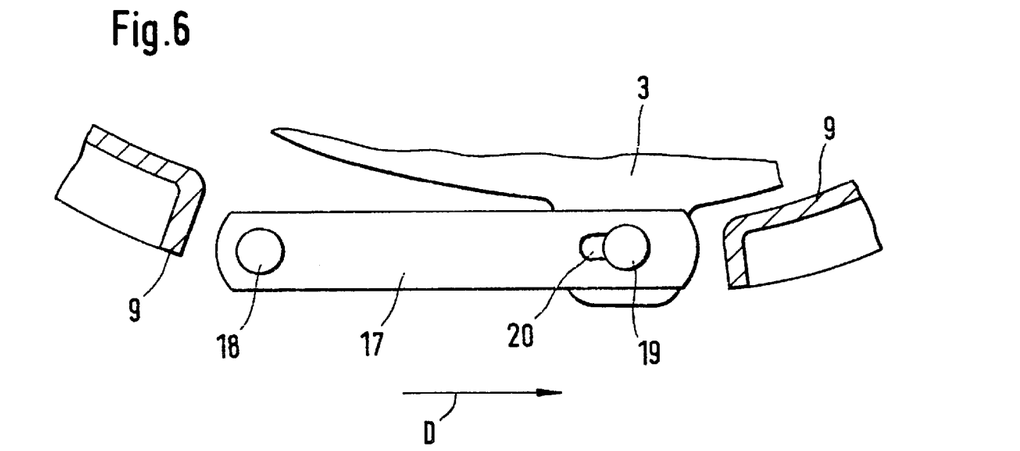
FIG. 6 is a sectional view of a friction clutch along line VI—VI in accordance with FIG. 5.

Referring now to FIGS. 5 and 6, the pressure plate 3 is guided on a circumferential periphery of the clutch casing 9 by a plurality of tangential leaf springs 17 (one of which is shown in FIGS. 5 and 6) which are circumferentially distributed between the pressure plate 3 and the circumferential periphery of the clutch casing 9. The tangential leaf springs 17 may be designed such that, absent any other force on the pressure plate 3, they exert a ventilating force on the pressure plate 3. The ventilating force generated by the tangential leaf springs 17 urges the pressure plate 3 away from the clutch disk 6. The pressure plate 3 and clutch casing 9 are connected in each case to the tangential leaf springs 17 by rivet connections 18, 19. The tangential leaf springs 17 include a slot 20 at one of the rivet connections 18, 19 which will be described in more detail below. FIG. 5 also shows a lining spring 16 which may be arranged between the two friction linings 11 and 12.

Referring again to FIGS. 1–3, devices 1 are arranged in the clutch casing 9 at one or more locations distributed over the circumference of the clutch casing 9. These devices include levers 2 which are pivotally mounted in webs 10, 10a on the clutch casing 9. The levers 2 each have an arm 21 which projects transversely with respect to a pivoting axis of the lever 2. The pivoting axes run essentially in the radial direction. The end of each arm 21 corresponds to a projection 31 on the pressure plate 3 which project essentially in the axial direction (cf. FIG. 2).

Figure 1:
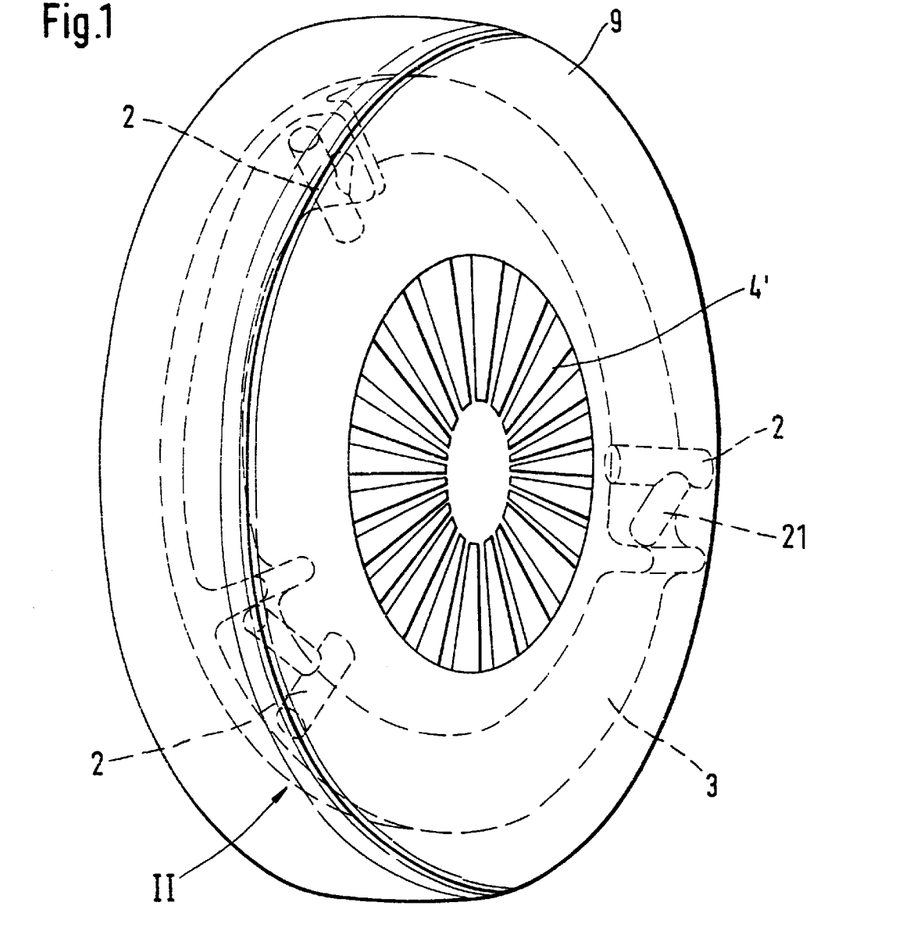
FIG. 1 is a perspective view of a friction clutch according to an embodiment of the present invention.
Figure 2:
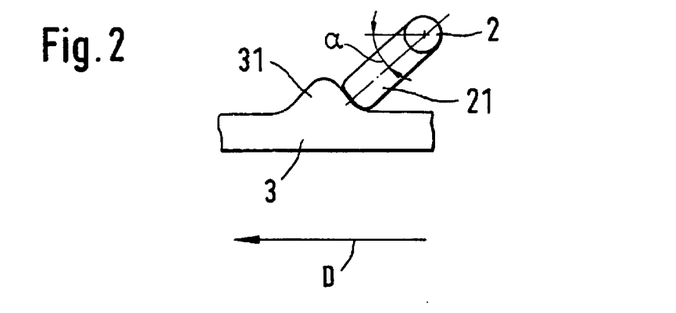
FIG. 2 is a partial side view of a pressure plate and lever in the direction of arrow II according to the embodiment of FIG. 1.
Figure 3:
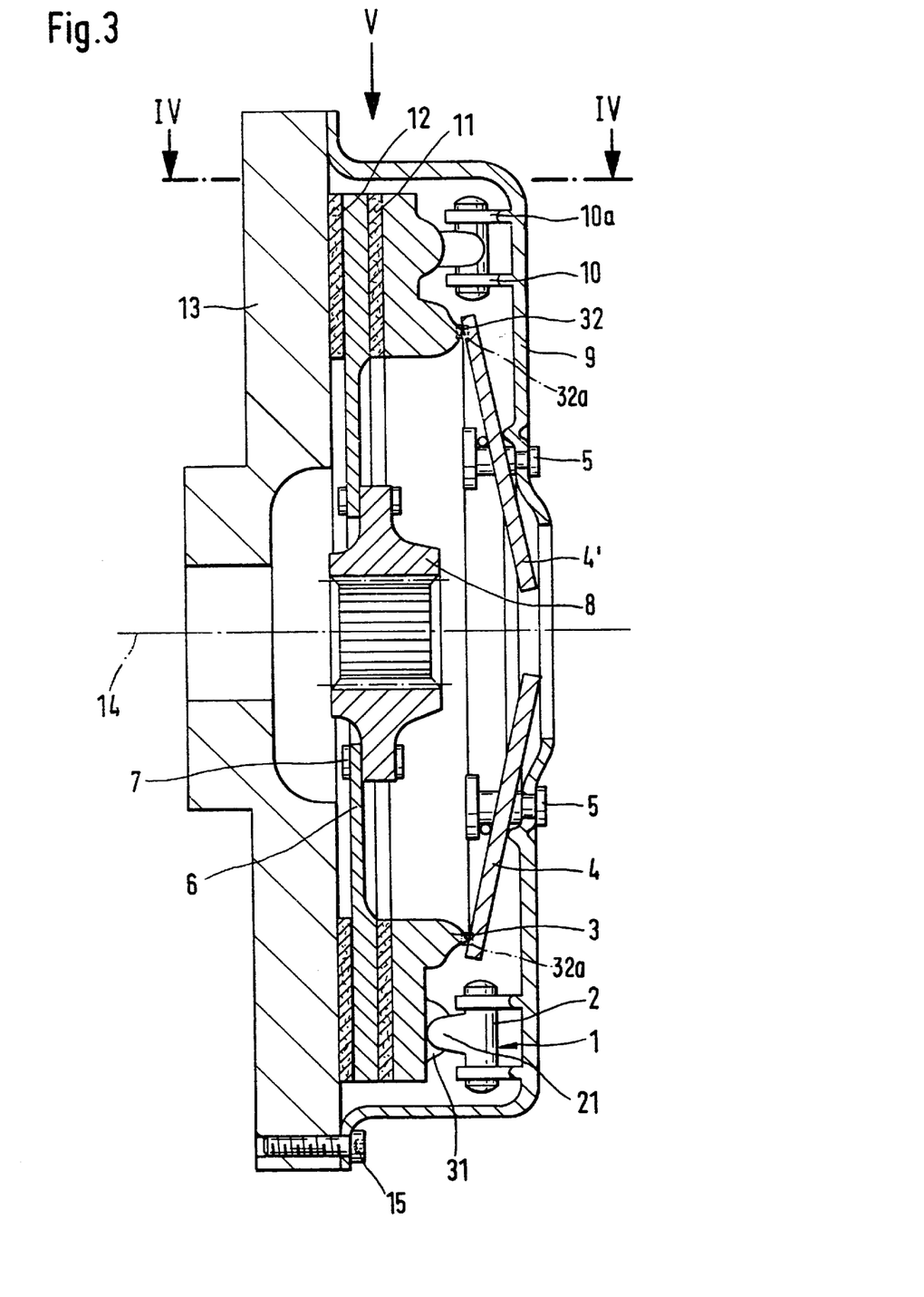
FIG. 3 is an axial sectional view through a friction clutch according to the embodiment of FIG. 1.

This device 1, which is formed by the lever 2, webs 10, 10a, arm 21, and projection 31, functions as follows:

During the engagement operation of the clutch and also during operation of the vehicle in the engaged state when the internal combustion engine is exerting an accelerating force on the driven flywheel 13—when the drive train is in a pulling mode—the friction linings 11, 12 of the clutch disk 6, which is connected to the transmission in a rotationally fixed manner, exert a "braking force" on the pressure plate 3 which is directed oppositely to the driving direction or direction of rotation D. During the pulling mode, the end of the arm 21 of the levers 2 bears against the projections 31 on the pressure plate 3, thereby circumferentially supporting the pressure plate 3. This circumferential support via the arm 21 and lever 2 is achievable because during the pulling mode, the slots 20 in the tangential leaf springs 17 as shown in FIG. 5 allow a slight relative movement of the pressure plate 3 relative to the clutch casing 9 counter to the direction of rotation D until the projections 31 abut the arms 21 of the devices 1. The slot 20 is arranged so that it does not permit this rotation of the pressure plate 3 in the direction of rotation D. In the pulling mode, the pressure plate 3 is circumferentially guided counter to the direction of rotation D by the tangential leaf springs 17. Accordingly, the device 1 for supporting the pressure plate 3 in accordance with the arrangement shown in FIG. 2 provides a reinforcement force which acts essentially proportionally to and in addition to the force of the diaphragm spring 4, so that in the pulling mode of operation, a higher torque can be transmitted. The extent of this self-reinforcing action is dependent on the angle $\alpha$ which is formed between the bearing of the arm 21 of the lever 2 which is held by the webs 10, 10a of the clutch casing 9 and the edges 32 (see FIG. 2). The larger the angle $\alpha$ in accordance with FIG. 2 is selected to be, the greater this self-reinforcing action becomes.

This self-reinforcing action may be improved by ensuring that the minimum possible friction force is produced between the diaphragm spring 4 and the pressure plate 3. This friction force reduces the required relatively small capacity of the pressure plate 3 to rotate. Therefore, the optional low friction bearing 32a shown in FIG. 1 which comprises, for example, a sliding-contact or roller bearing and exhibits the minimum possible friction may be provided.

The above-described self-reinforcing action for the pressure force of the pressure plate 3 is produced for as long as the internal combustion engine provides a driving force to the drive train—as long as the drive train is in the pulling mode. This driving force is present when the vehicle is moving off, when accelerating and also at high speeds because the motor must provide a force to maintain the high speed. However, if the driver releases the gas pedal, the drive train enters a pushing mode in which the transmission rotates the clutch disk and generates a pushing force on the internal combustion engine due to the momentum of the vehicle which rotates the engine via the clutch disk. This drag moment on the engine eliminates the self-reinforcing action and reduces the pressure force—instead of pulling the motor vehicle, the motor is now being pushed at a higher rotation by the vehicle. This action can advantageously be utilized, in extreme cases, for example in the event of the driver changing down incorrectly, to allow the clutch disk to slip at least for a short time, so that it is possible to avoid an overload on the internal combustion engine (excessive rotation).

The change $F_{AP}$ in pressure force in the design described above corresponds to the formula given below:

$$F_{AP} = F_F * \frac{1}{1 - \mu \tan \alpha} 1$$

where $F_F$ is the force applied by the diaphragm spring 4, $\mu$ is the coefficient of friction between the friction linings 11, 12 and the flywheel 13 or the pressure plate 3, and the angle $\alpha$ is the current angle of the arm 21.

FIGS. 4a to 4d clearly show how the device may be designed in order to achieve different effects.

Figure 4A:
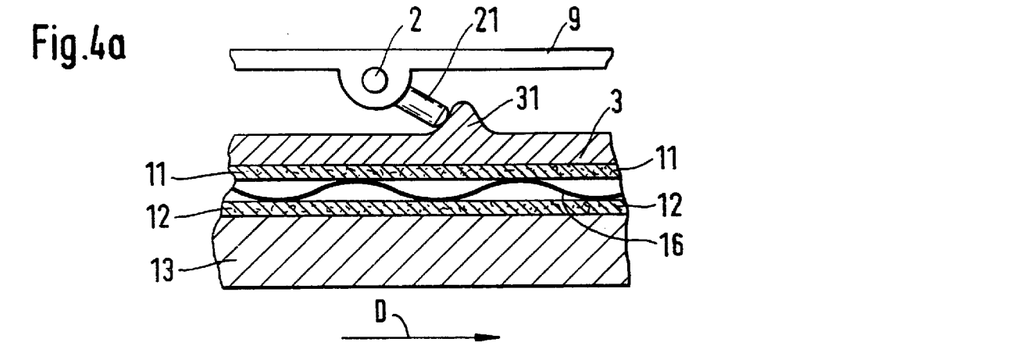
FIG. 4a is a sectional view along line IV—IV in accordance with FIG. 3.

FIG. 4a corresponds to the clutch design illustrated in FIGS. 1 to 3 and 5 and 6. There is no need to go into this action in more detail.

Figure 4B:
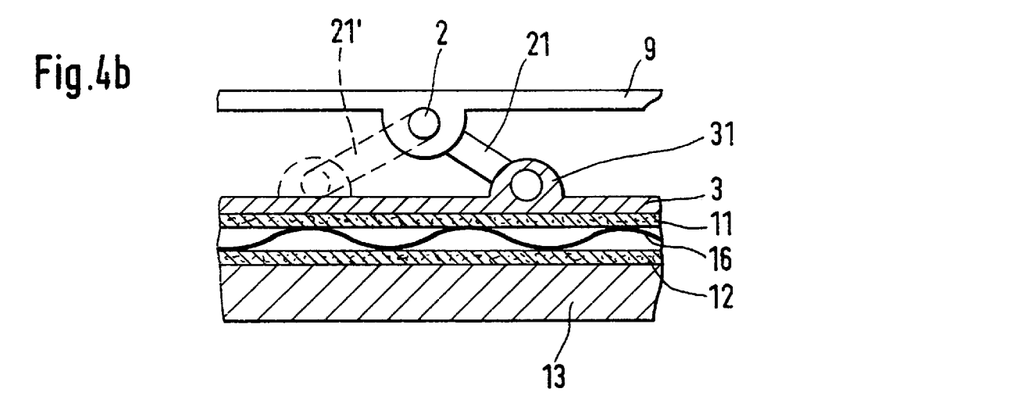
FIG. 4b is a sectional view along line IV—IV in accordance with FIG. 3 showing another embodiment with two levers attached in an articulated manner on both sides.

A further embodiment is shown in FIG. 4b in which an additional arm 21' of the lever 2 is used. Both the arm 21 and the additional arm 21' comprise closed links between the clutch casing 9 and the pressure plate 3. The previous embodiment of FIG. 4a has only one closed link and one open link. In the embodiment of FIG. 4b, the tangential leaf spring 17 in accordance with FIG. 5 is freed from its torque attachment to the pressure plate 3 and is only required to apply a ventilating force at most. In this design, the arms 21, 21' of the lever 2 absorb both compressive forces and tensile forces. Moreover, exact mounting of the lever 2 is ensured in all operating conditions.

Alternately, it is also conceivable for the arms 21, 21' each to have one open link with respect to the clutch casing 9 or the pressure plate 3, in which case it is necessary to provide a guide which ensures that the location and position of the levers cannot change uncontrollably. If it is assumed that the direction of rotation D in FIG. 4b is the same as that in FIG. 4a, the design of the arm 21 is identical to that shown in FIG. 4a, in terms of its action, so that the pressure force is increased in pulling mode. However, if, in such a case, the design illustrated in dashed lines, with an arm 21', is selected, during pulling mode in the drive train, this structure reduces the pressure force of the diaphragm spring 4 on the pressure plate 3. Such an arrangement may advantageously be used when friction linings are used which are made from inorganic material and in which the coefficient of friction $\mu$ falls within a certain range above the sliding speed. In this case of self-attenuation of the pressure force, all that changes in the formula given above is the sign before the angle $\alpha$.

Figure 4C:
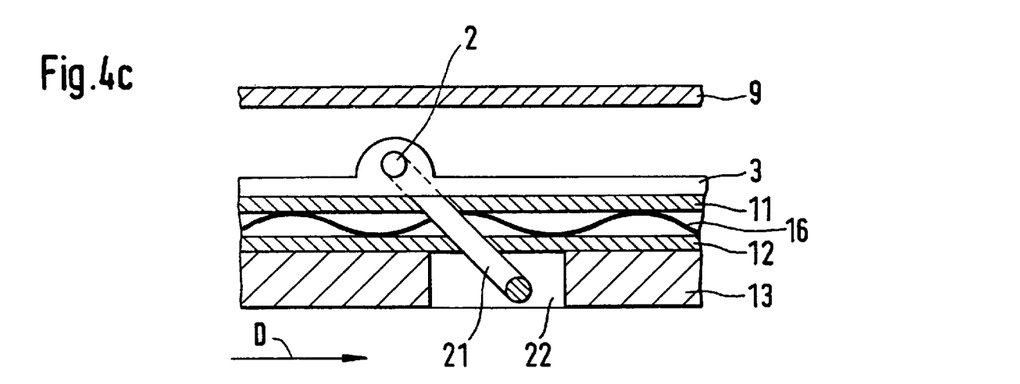
FIG. 4c is a sectional view along line IV—IV in accordance with FIG. 3 showing another embodiment of the lever attached in an articulated manner to the flywheel.

Another embodiment is shown in FIG. 4c in which the arm 21 of the lever 2 at one end is arranged on the pressure plate 3 with a closed link and at the other end is arranged on the flywheel 13, again with a closed link. For this purpose, a recess 22 is provided on the flywheel 13. Assuming pulling mode and a direction of rotation corresponding to D, the levers 2, together with their arms 21, are subjected to tensile load and exert a self-reinforcing force on the pressure plate 3.

Figure 4D:
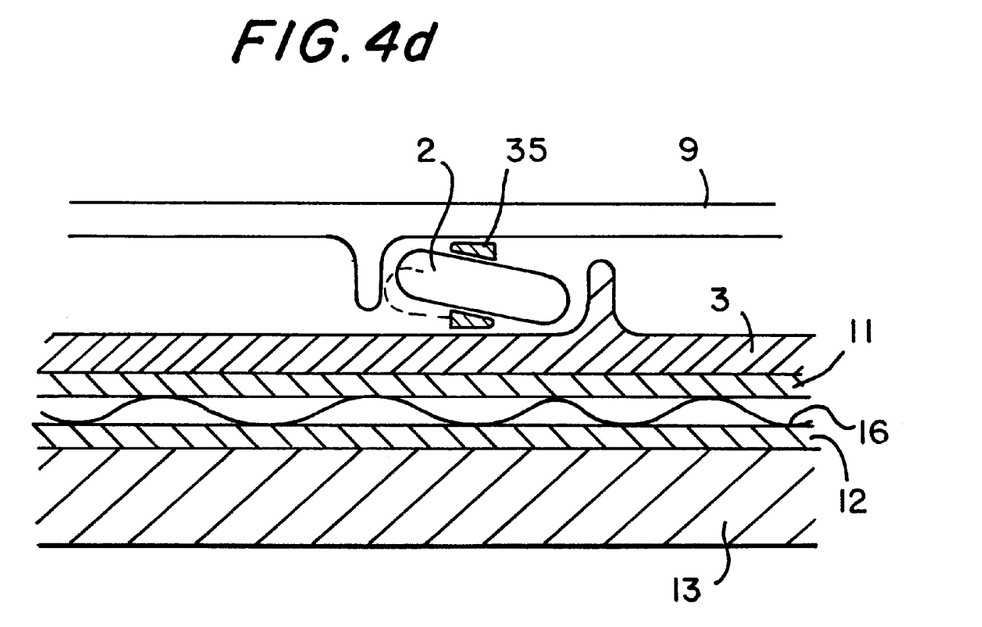
FIG. 4d is a sectional view along line IV—IV in accordance with FIG. 3 showing yet another embodiment of the lever having two open links.

FIG. 4d shows yet another embodiment in which the lever 2 is connected between the clutch casing 9 and the pressure plate 3 via two open links. In this embodiment, an independent guide 35 holds the lever 2 in a proper position.

Figure 7:
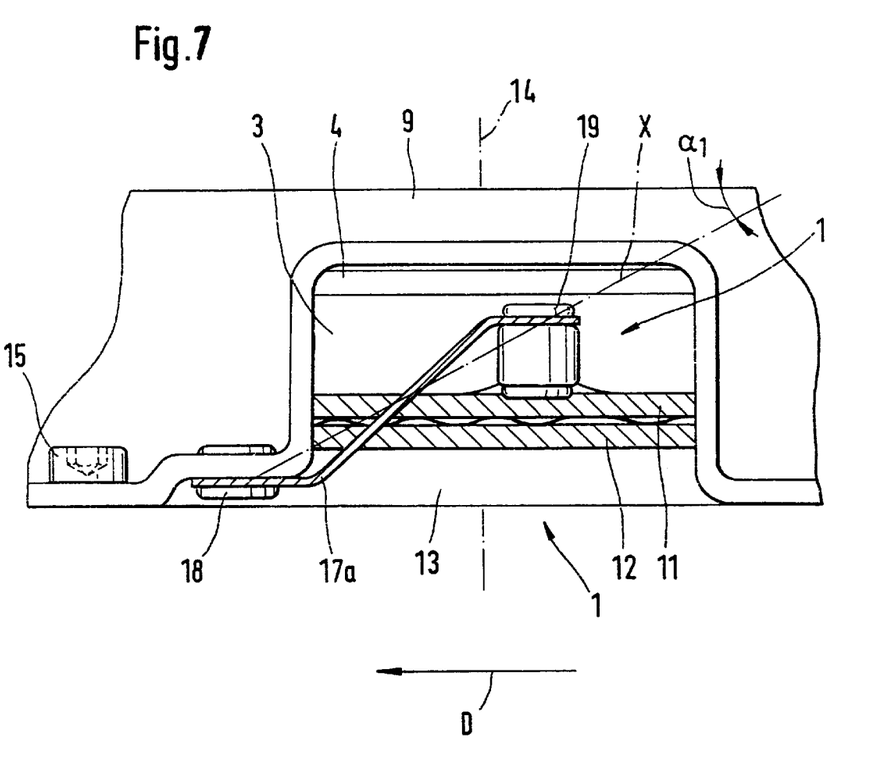
FIG. 7 is a partial radial view of a further embodiment of the friction clutch similar to that shown in FIG. 5 with a self-reinforcing leaf spring attachment.

FIG. 7 illustrates an embodiment in which a tangential leaf spring 17a assumes the function of the above-described lever 2 with their arms 21, 21'. One end of the tangential leaf spring 17a is connected fixedly to the pressure plate 3 by a rivet connection 19, while the other end is connected fixedly to the clutch casing 9 by a rivet connection 18. Instead of being connected to the clutch casing 9, the leaf spring 17a may also be connected directly to the flywheel 13. The drawing furthermore shows the radially outer edge of the diaphragm spring 4, as well as the friction linings 11, 12 of the clutch disk and the screw connection 15 between clutch casing 9 and flywheel 13. The axis of rotation of the overall friction clutch is indicated by 14. Where it is desired for the pressure force to be self-reinforcing in pulling mode, the arrangement is made in such a way that the direction of rotation corresponds to D and the line X which connects the two rivet connections 18 and 19 is arranged in such a manner that the angle $\alpha_1$ between the connecting line X and a plane parallel to the friction linings 11, 12 is arranged to be mathematically positive. Therefore, in this embodiment, the pressure force is increased in pulling mode and reduced in pushing mode. If the direction of rotation is reversed, or if the angle $\alpha_1$ is mathematically negative, the actions in the pulling mode and pushing mode are correspondingly reversed.

The invention is not limited by the embodiments described above which are presented as examples only but can be modified in various ways within the scope of protection defined by the appended patent claims.

We claim:

1. A friction clutch for use in a motor vehicle drive train, said friction clutch comprising:
   a driven flywheel rotatably mounted about a rotational axis;
   a clutch casing rotatably mounted about said rotational axis and connectable to said driven flywheel for rotation with said driven flywheel;
   a clutch disk having friction linings, a pressure plate, and a pressure spring arranged in said clutch casing such that said pressure spring is supported between said clutch casing and said pressure plate, said pressure spring producing a force on said pressure plate for urging said clutch disk toward said flywheel via said pressure plate when said friction clutch is in an engaged position; and
   a device comprising at least one closed link operatively arranged between said clutch casing and said pressure plate for varying a force that said pressure plate exerts on said clutch disk proportionally and parallel to the force produced by said pressure spring in said engaged position, wherein said device increases the pressure force when the motor vehicle drive train is in a pulling mode, and
   wherein said pressure plate is rotatable relative to said clutch casino within a predetermined range and said device comprises a lever pivotably arranged between said pressure plate and one of said clutch casing and said flywheel.

2. The friction clutch of claim 1, wherein said lever exerts a compressive force on said pressure plate when said pressure plate is rotated by said predetermined amount relative to said one of said clutch casing and said flywheel.

3. The friction clutch of claim 1, wherein said lever exerts a tensile force on said pressure plate when said pressure plate is rotated by said predetermined amount relative to said one of said clutch casing and said flywheel.

4. The friction clutch of claim 1, further comprising a low-friction bearing arranged at a contact point between said pressure plate and said pressure spring.

5. A friction clutch for use in a motor vehicle drive train, said friction clutch comprising:
   a driven flywheel rotatably mounted about a rotational axis;
   a clutch casing rotatably mounted about said rotational axis and connectable to said driven flywheel for rotation with said driven flywheel;

a clutch disk having friction linings, a pressure plate, and a pressure spring arranged in said clutch casino such that said pressure spring is supported between said clutch casing and said pressure plate said pressure spring producing a force on said pressure plate for urging said clutch disk toward said flywheel via said pressure plate when said friction clutch is in an engaged position; and a device comprising two open links operatively arranged between said clutch casing and said pressure plate for varying a force that said pressure plate exerts on said clutch disk proportionally and parallel to the force produced by said pressure spring in said engaged position, wherein said device increases the pressure force when the motor vehicle drive train is in a pulling mode, wherein said pressure plate is rotatable relative to said clutch casing within a predetermined range and said device comprises a lever pivotably arranged between said pressure plate and one of said clutch casing and said flywheel.

6. The friction clutch of claim 5, wherein said lever exerts a compressive force on said pressure plate when said pressure plate is rotated by said predetermined amount relative to said one of said clutch casing and said flywheel.

7. The friction clutch of claim 5, wherein said lever comprises an arm which bears against said pressure plate.

8. A friction clutch for use in a motor vehicle drive train, said friction clutch comprising:

a driven flywheel rotatably mounted about a rotational axis;

a clutch casing rotatable mounted about said rotational axis and connectable to said driven flywheel for rotation with said driven flywheel;

a clutch disk having friction linings, a pressure plate, and a pressure spring arranged in said clutch casing such that said pressure spring is supported between said clutch casing and said pressure plate, said pressure spring producing a force on said pressure plate for urging said clutch disk toward said flywheel via said pressure plate when said friction clutch is in an engaged position; and a device operatively arranged between said clutch casing and said pressure plate for varying a force that said pressure plate exerts on said clutch disk proportionally and parallel to the force produced by said pressure spring in said engagaed position, wherein said device increases the pressure force when the motor vehicle drive train is in a pulling mode, wherein said pressure plate is rotatable relative to said clutch casino within a predetermined range and said device comprises a lever pivotably arranged between said pressure plate and one of said clutch casing and said flywheel, and wherein said device comprises a leaf spring connected between said pressure plate and said clutch casing and said leaf spring comprises a slot for allowing said relative movement between said pressure plate and said clutch casing.

9. A friction clutch for use in a motor vehicle drive train, said friction clutch comprising:

a driven flywheel rotatable mounted about a rotational axis;

a clutch casing rotatable mounted about said rotational axis and connectable to said driven flywheel for rotation with said driven flywheel;

a clutch disk having friction linings, a pressure plate, and a pressure spring arranged in said clutch casing such that said pressure spring is supported between said clutch casing and said pressure plate, said pressure spring producing a force on said pressure plate for urging said clutch disk toward said flywheel via said pressure plate when said friction clutch is in an engaged position; and a device operatively arranged between said clutch casing and said pressure plate for varying a force that said pressure plate exerts on said clutch disk proportionally and parallel to the force produced by said pressure spring in said engaged position, wherein said device increases the pressure force when the motor vehicle drive train is in a pulling mode, and wherein said device comprises a leaf spring connected to said pressure plate and said clutch casing, a connection point of said leaf spring to said pressure plate lies at a rear of said leaf spring with respect to a direction of rotation (D) about said axis of rotation and a connection point of said leaf spring to said clutch casing lies at a front of said leaf spring with respect to said direction of rotation, and a line (X) which connects said connection points being provided in a mathematically positive angle range ($\alpha_1$) starting from a plane parallel to said friction surfaces of said clutch disk.

10. The friction clutch as claimed in claim 9, wherein said front connection point is arranged on said flywheel.

11. A friction clutch for use in a motor vehicle drive train, said friction clutch comprising:

a driven flywheel rotatably mounted about a rotational axis;

a clutch casing rotatably mounted about said rotational axis and connected to said driven flywheel for rotation with said driven flywheel;

a clutch disk having friction linings, a pressure plate, and a pressure spring arranged in said clutch casing such that said pressure spring is supported between said clutch casing and said pressure plate for urging said clutch disk toward the flywheel via said pressure plate when said friction clutch is in an engaged position, said friction linings comprising an inorganic material and having a coefficient of friction which decreases as a sliding speed between said friction linings and said flywheel and said pressure plate increases; and a device operatively arranged for acting on said pressure plate during an engagement of said friction clutch in parallel to a force of said pressure spring for reducing the pressure force of said pressure plate proportionally to the force of said pressure spring in a pulling mode of said clutch.

12. The friction clutch of claim 11, wherein said pressure plate is rotatable relative to said clutch casing within a predetermined range and said device comprises a lever pivotably arranged between said pressure plate and one of said clutch casing and said flywheel.

13. The friction clutch of claim 12, wherein said device comprises at least one closed link.

14. The friction clutch of claim 12, wherein said device comprises two open links.

15. The friction clutch of claim 13, wherein said lever exerts a compressive force on said pressure plate when said pressure plate is rotated by said predetermined amount relative to said one of said clutch casing and said flywheel.

16. The friction clutch of claim 14, wherein said lever exerts a compressive force on said pressure plate when said pressure plate is rotated by said predetermined amount relative to said one of said clutch casing and said flywheel.

17. The friction clutch of claim 13, wherein said lever exerts a tensile force on said pressure plate when said pressure plate is rotated by said predetermined amount relative to said one of said clutch casing and said flywheel.

18. The friction clutch of claim 12, wherein said device comprises a leaf spring connected between said pressure plate and said clutch casing and said leaf spring comprises a slot for allowing said relative movement between said pressure plate and said clutch casing.

19. The friction clutch of claim 12, wherein said lever comprises an arm which bears against said pressure plate.

20. The friction clutch of claim 11, further comprising a low-friction bearing arranged at a contact point between said pressure plate and said pressure spring.

* * * * *